US012622552B2

(12) United States Patent
Hansen et al.

(10) Patent No.: US 12,622,552 B2
(45) Date of Patent: May 12, 2026

(54) INCINERATION TOILET WITH SAFETY SYSTEM

(71) Applicant: Cinderella Technology AS, Midsund (NO)

(72) Inventors: Frode Hansen, Lyngseidet (NO); Odd Arne Aslaksen, Furuflaten (NO); Freddy Roger Moen, Levanger (NO)

(73) Assignee: Cinderella Technology AS, Midsund (NO)

( * ) Notice: Subject to any disclaimer, the term of this patent is extended or adjusted under 35 U.S.C. 154(b) by 123 days.

(21) Appl. No.: 18/730,640

(22) PCT Filed: Jan. 19, 2023

(86) PCT No.: PCT/EP2023/051299
§ 371 (c)(1),
(2) Date: Jul. 19, 2024

(87) PCT Pub. No.: WO2023/139184
PCT Pub. Date: Jul. 27, 2023

(65) Prior Publication Data
US 2025/0160584 A1      May 22, 2025

(30) Foreign Application Priority Data
Jan. 21, 2022    (NO) .................................... 20220109

(51) Int. Cl.
*A47K 11/02* (2006.01)
*G01K 3/00* (2006.01)
*G01V 3/10* (2006.01)

(52) U.S. Cl.
CPC ............ *A47K 11/023* (2013.01); *G01K 3/005* (2013.01); *G01V 3/10* (2013.01)

(58) Field of Classification Search
CPC ......... A47K 11/023; G01K 3/005; G01V 3/10
See application file for complete search history.

(56) References Cited

U.S. PATENT DOCUMENTS

| | | | |
|---|---|---|---|
| 3,320,907 | A | 5/1967 | Duncan |
| 3,458,873 | A | 8/1969 | Delin et al. |

(Continued)

FOREIGN PATENT DOCUMENTS

| | | |
|---|---|---|
| EP | 3001938 B1 | 12/2019 |
| GB | 1154461 A | 6/1969 |
| WO | 2007114747 A1 | 10/2007 |

OTHER PUBLICATIONS

International Search Report issued in International Application No. PCT/EP2023/051299, mailed May 3, 2023 (3 pages).

(Continued)

*Primary Examiner* — Janie M Loeppke
(74) *Attorney, Agent, or Firm* — Osha Bergman Watanabe & Burton LLP

(57) ABSTRACT

An incineration toilet includes a pouch bowl for holding a waste pouch, and an incineration chamber with an incineration chamber hatch arranged below the pouch bowl for receiving the waste pouch for incineration. The incineration chamber hatch is openable by an electric motor. The pouch bowl includes an openable bowl flap synchronized with the openable incineration chamber hatch such that when the electric motor opens the incineration chamber hatch, the bowl flap opens simultaneously such that the waste pouch can fall into the incineration chamber. The incineration toilet further includes a lid for covering a top opening of the pouch bowl. The lid is operable between an open position in which the top opening of the pouch bowl is open and can receive waste, and a closed position in which the top opening is closed and cannot receive waste. The incineration toilet further includes a security system including a security control system, and one or more sensors. The one or more sensors are arranged for reading the position of the lid and for measuring the temperature in the incineration chamber. The security control system controls the electric motor such (Continued)

that the incineration chamber hatch is prevented from being opened when the temperature in the incineration chamber is above a threshold value and the lid is in the open position.

8 Claims, 3 Drawing Sheets

(56) References Cited

U.S. PATENT DOCUMENTS

| | | | |
|---|---|---|---|
| 3,703,732 A | 11/1972 | Green | |
| 3,867,729 A | 2/1975 | Helke | |
| 5,304,780 A | 4/1994 | Blankenship | |
| 6,052,836 A | 4/2000 | Pedersen | |
| 11,946,270 B2 * | 4/2024 | Carter .................. | B61D 35/005 |

OTHER PUBLICATIONS

Written Opinion issued in International Application No. PCT/EP2023/051299; Dated May 3, 2023 (5 pages).
International Preliminary Report on Patentability issued in International Application No. PCT/EP2023/051299; mailed Apr. 22, 2024 (11 pages).
Search Report issued in Norwegian Application No. 20220109; Dated Aug. 16, 2022 (2 pages).

* cited by examiner

10

11    12,14    15

21

23

24

22

25

12,13

10

INCINERATION TOILET WITH SAFETY SYSTEM

The present invention is directed to an incineration toilet comprising a security system for controlling an electric motor operating an incineration chamber hatch covering an opening of an incineration chamber. The incineration chamber hatch is prevented from being opened in the event the lid is in the open position or the temperature in the incineration chamber is above a threshold value.

BACKGROUND

Incinerating toilets are self-contained waterless systems that do not require being hooked up to a sewer system or inground septic system. They rely on electric power or natural or propane gas to incinerate human waste to sterile clean ash.

The incineration toilet burns biological waste at high temperatures, leaving only an insignificant quantity of ash. The waste is burned in an enclosed incineration chamber, and the incineration gases are expelled through a separate ventilation pipe.

The incineration toilet may comprise a pouch bowl for holding a waste pouch, and an incineration chamber with a hatch arranged below the pouch bowl for receiving the waste pouch into the incineration chamber. The hatch being openable manually or by an electric motor. The pouch bowl further comprises an openable flap synchronized with the openable hatch such that when the hatch is opened, the flap is opened simultaneously such that the waste pouch can fall into the incineration chamber. The flap may comprise a hook device arranged to cooperate with a mating head arranged on the incineration chamber hatch, such that when the hatch opens, the mating head pulls the hook such that the flap opens in the same operation. Inside the incineration chamber, the waste pouch containing biological waste are burned into ashes.

Publication EP 3001938B1 discloses an incineration toilet comprising a pouch bowl comprising a flap, and an incineration chamber located below the pouch bowl, comprising an incineration chamber hatch. The hatch and the flap are synchronised such that when the hatch opens, the flap opens simultaneously such that the waste pouch can de deposit into the incineration chamber.

The incineration process burns waste into ashes at very high temperatures and for this reason the incineration chamber should be properly isolated and arranged such that the user don't have access to the inside of the incineration chamber.

To avoid harm to the user, the incineration chamber needs to be properly sealed by the incineration chamber hatch so that heat or flames don't stand out from the incineration chamber. In addition, the toilet needs a proper safety system that prevents the user to open the incineration chamber hatch when the incineration process is ongoing.

The term "incineration process" means that the burner or heating element is active.

The objective of the present invention is therefore to provide a safety system to avoid harm or injury to the user when using the toilet.

Another objective is to provide a safety system that prevents the incineration chamber hatch from being opened during use., i.e., when the user sitting on the toilet.

SUMMARY OF THE INVENTION

The present invention is directed to an incineration toilet comprising a security system comprising a security control system and one or more sensors, and wherein the security control system controls the opening and closing of the incineration chamber hatch based on input from the one or more sensors.

The invention is directed to an incineration toilet comprising a pouch bowl for holding a waste pouch, and an incineration chamber with an incineration chamber hatch arranged below the pouch bowl for receiving the waste pouch for incineration. The incineration chamber hatch being openable by an electric motor.

The pouch bowl comprises an openable flap synchronized with the openable incineration chamber hatch such that when the electric motor opens the hatch, the flap is opened simultaneously such that the waste pouch can fall into the incineration chamber.

The incineration toilet comprises a lid for covering a top opening of the pouch bowl, the lid is operable between an open position in which the top opening of the pouch bowl can receive waste, and a closed position in which the top opening is closed and cannot receive waste.

The incineration toilet further comprises a security system. The security system comprising a security control system, and one or more sensors for reading the position of the lid and for measuring the temperature in the incineration chamber, and wherein the security control system controls the electric motor such that the hatch is prevented from being opened when the lid is in the open position and the temperature in the incineration chamber is above a threshold value.

The lid is referred to a toilet cover and used to keep the toilet safe when it's not being used. The lid is moveable between an open position in which the toilet top opening is open and the toilet can be used, and a closed position where the lid is closing the top opening to prevent small items from falling in, to reduce odours, for aesthetic purposes or to provide a chair in the toilet room.

During the opening sequence of the incineration chamber hatch, the hatch forces the flap of the pouch bowl open by means of a mechanical cooperating element provided on respective hatch and flap. The flap may again be spring loaded such that it returns to its closed position after depositing the waste pouch.

The security system of the present invention prevents the user from being exposed to the heat and/or flames of the incineration chamber, thus avoiding burns.

The security control system of the present invention prevents the incineration chamber hatch from being opened when the user is sitting on the toilet. It also prevents hands or body parts to get stuck or burned.

The security system is operated such that the incineration chamber hatch cannot be opened in the event the lid is open. "Flushing" or depositing the waste and waste pouch into the incineration chamber can only be conducted when the lid is in the closed position. In addition, the security system assures the temperature inside the incineration is below a threshold value before the incineration chamber hatch is allowed to open. Thus, it will allow the incineration chamber hatch to be opened only in the event the temperature is within a threshold value.

The security system of the present invention is thus triggered by the position of the lid and the measured temperature in the incineration chamber.

The terms "security" and "safety" are used interchangeably throughout the application, and refers to the same system.

The one or more sensors for measuring the temperature in the incineration chamber may be located inside the incineration chamber, adjacent the incineration chamber or in connection with the incineration chamber.

The incineration chamber may comprise an outlet tube, hose or conduit connected to the incineration chamber, and wherein the one or more sensors for reading the temperature of the incineration chamber is located in the outlet tube, hose or conduit so that the one or more sensors are not directly exposed to the heat/flames. The tube, hose or conduit may be in communication with the inside of the incineration chamber for measuring the temperature inside the chamber.

The one or more sensors may be a temperature sensor.

The one or more sensors may be a K-sensor. The type K thermocouple refers to any temperature sensor containing Chromel and Alumel conductors. This may be an immersion sensor, a surface sensor, wire or another style of sensor or cable.

The one or more sensors measures the temperature inside the incineration chamber and communicates with the security control system for comparison with the temperature threshold value.

The temperature threshold value may be set to any temperature. Preferably, the threshold value temperature is set to a temperature that potentially causes less or minimal harm to the user.

The temperature threshold value may be set to 90° C. (degree Celsius), and the security control system prevents the hatch from being opened in the event the temperature in the incineration chamber is above 90° C.

The temperature 90° C. may be preferable since the ashes stop emitting smoke approximately at this temperature, and the user may normally not experience extreme burns when exposed to heat at this temperature. As mentioned above, other temperatures may also be appropriate depending on the safety requirements.

The sensor for reading the position of the lid may be a position sensor. The position sensor detects the lid and relay its position through the generation of a signal that provides positional feedback. This feedback may then be used to control automated response in the safety system. Position sensors may be any one of: potentiometric, inductive, eddy current-based, capacitive, magnetostrictive, hall effect-based, fibre-optic, optical, ultrasonic, etc.

The one or more sensors may be an inductive position sensor. The inductive sensor is a device that uses the principle of electromagnetic induction to detect or measure objects, such as the lid. The inductor develops a magnetic field when a current flows through it. Alternatively, a current may flow through a circuit containing an inductor when the magnetic field through it changes. The effect is used to detect metallic objects that interact with a magnetic field. Non-metallic substances such as liquids or dirt's may not interact with the magnetic field, so that the inductive sensor can operate in wet or dirty conditions.

The inductive proximity sensor may detect metal targets approaching the sensor, without physical contact with the target. The proximity sensors may be roughly classified into three types according to the operating principle: high frequency oscillation type using electromagnetic induction, the magnetic type using a magnet, and the capacitance type using the change in capacitance.

Within the scope of the invention, any type of inductive proximity sensor may be used.

A magnet may be located in the lid for activating the inductive sensor when the lid is in the closed position. When the inductive sensor detects the magnet, it will read that the lid is in the closed position. The signal is sent to the security control system whereby allowing the incineration chamber hatch to be opened or allowing the incineration process to start. For increased safety, the security control system may only allow the incineration process to start in the event the lid is in the closed position.

The security system may also comprise a hatch control system for reading the position of the incineration chamber hatch. When depositing ("flushing") the waste into the incineration chamber, the waste pouch may sometimes be stuck, jammed, or wedged between the incineration chamber opening and the incineration chamber hatch. The hatch control system controls that the incineration chamber hatch is totally closed prior to starting of the incineration process.

Thus, the hatch control system may comprise a first hatch sensor for reading the open position of the incineration chamber hatch, and a second hatch sensor for reading the closed position of the incineration chamber hatch. The sensors may be any one of a position sensor mentioned earlier. The second hatch sensor communicates with the security control system such that the incineration can start only in the event the incineration chamber hatch is in the closed position. In the event of a jam, the second hatch sensor will read that the incineration chamber hatch is not closing the incineration chamber, and the incineration will not start until the jamming has been solved. The security control system reads that a jam has occurred and may trigger an alarm to warn the user. The alarm may be a sound alarm.

In any situation, the security control system allows the incineration process to start only in the event the incineration chamber hatch is closed. This means that during deposit of the waste pouch, or when the incineration chamber hatch is open, the incineration process will be stopped. This process is operated by the security control system by cutting the power to the burner or heating element when the one or more sensors detect that the hatch is in the open position.

The incineration chamber may comprise an ash tray situated below the heating elements such that the ashes can be collected and emptied. The ash tray being the lower compartment of the incineration chamber. The ash tray may be removed such that its contents can be emptied. For safety reasons, it is essential that the ash tray is put back in the right position before it can be used. If the ash tray is not in the correct position, heat, smoke, and fire can spread into the internal of the toilet and cause danger to the user and to the toilet.

Therefore, the incineration toilet may comprise yet another safety system. The incineration toilet may further comprise an ash tray position sensor arranged to read the position of the ash tray; the ash tray sensor communicates with the security control system such that the incineration process can start only in the event the ash tray is in a predefined correct position. The ash tray position sensor may be any of a position sensor and may be located at the back or any side, inside of the incineration toilet.

The incineration toilet may also comprise a temperature guard device, the device cuts the power of the burner in the event the temperature outside the incineration chamber exceeds 105° C. The device may be a push button that is ejected and may be manually reset, the temperature guard device may be a bi-metal switch.

Further objects, structural embodiments and advantages of the present invention will be seen clearly from the following detailed description, the attached figures, and the claims below.

FIGURES

The invention will now be described with reference to the attached figures, wherein.

DETAILED DESCRIPTION OF THE FIGURES

In the following, exemplified embodiments of the invention will be discussed in detail with reference to the appended figures. It should be understood, however, that the figures are not intended to limit the invention to the subject-matter depicted in the figures.

Figure 1:
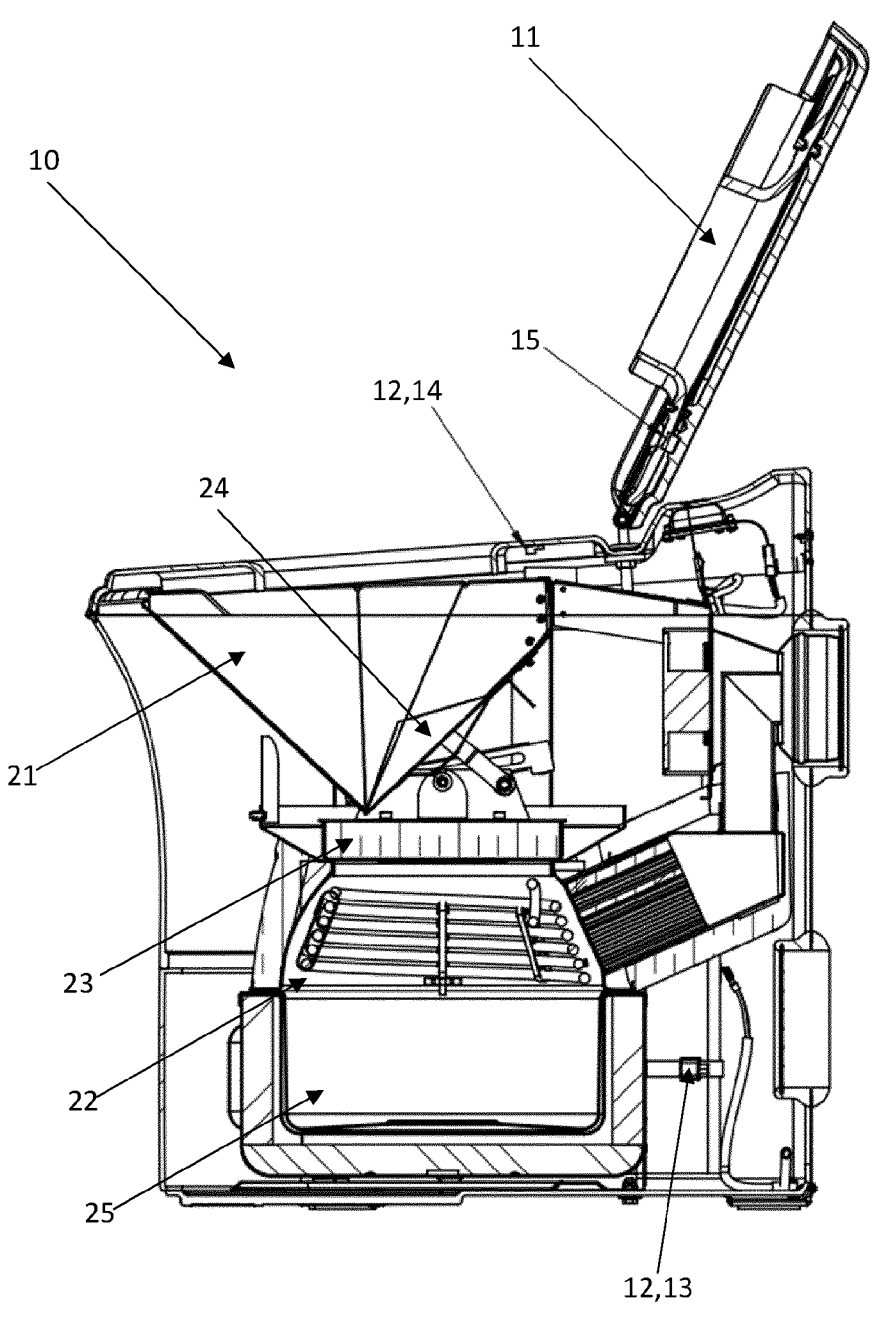
FIG. 1 shows a cross sectional view of the incineration toilet with the lid in open position and the incineration chamber hatch in the closed position.

FIG. 1 shows a cross sectional view of an incineration toilet 10 according to the present invention. The incineration toilet 10 comprising a pouch bowl 21 for holding a waste pouch (not shown). The waste pouch may be a paper bag or envelope for receiving the waste to be incinerated. The incineration toilet 10 further comprises an incineration chamber 22 arranged below the pouch bowl 21 for receiving the waste pouch to be incinerated. The incineration chamber 22 comprises an opening closable by an incineration chamber hatch 23, the hatch 23 being moveable between an open position in which the opening to the incineration chamber 22 is open, and a closed position in which it closes the opening. The incineration chamber hatch 23 being openable by an electric motor 26.

The pouch bowl 21 comprises an openable bowl flap 24 synchronized with the openable incineration chamber hatch 23 such that when the electric motor 26 opens the incineration chamber hatch 23, a lifting device on the top of the hatch 23 pulls the bowl flap 24 such that it opens simultaneously, and such that the waste pouch can fall into the incineration chamber 22. In FIG. 1, both the bowl flap 24 and the incineration chamber hatch 23 are in the closed position.

As shown in FIG. 1, the incineration toilet 10 further comprises a lid 11 for covering a top opening of the toilet 10 and the pouch bowl 21. The lid 11 is operable between an open position in which the top opening of the pouch bowl 21 can receive waste, and a closed position in which the top opening is closed off and cannot receive waste. FIG. 1 shows the lid 11 in the open position.

The incineration toilet 10 comprises a toilet seat arranged at the perimeter of the opening of the toilet 10. When the lid 11 is in the closed position, it is supported by the toilet seat.

An inductive sensor 14 may be located below the toilet seat and arranged to detect a magnet 15 situated in the lid 11 to read the position of the lid 11. In operation, when the inductive sensor 14 detects the magnet 15 it knows that the lid 11 is in the closed position and sends this information to the control system 20 or security control system 20, wherein the control system 20 further allows the electric motor 26 to run such that the incineration chamber hatch 23 and the pouch bowl flap 24 can be opened. In the event, the inductive sensor 14 detects no magnet 15, the control system will know that the lid 11 is in the open position, the electric motor 26 will not be allowed to start.

The security system may also comprise a temperature sensor 13 located in a tube/hose/conduit in connection with the internal of the incineration chamber 22 for reading the temperature inside the incineration chamber 22. The tube being in direct communication with the internal of the incineration chamber 22. In the event the temperature inside the incineration chamber 22 is above a temperature threshold value, the control system 20 prevents the electric motor 26 from being started. This may be done by cutting off the power supply to the electric motor. The temperature threshold value may be set to 90° C.

According to the present invention, the security control system 20 controls the electric motor 26 such that the incineration chamber hatch 23 is prevented from being opened when the lid 11 is in the open position and when the temperature in the incineration chamber 22 is above a threshold value.

Figure 2:
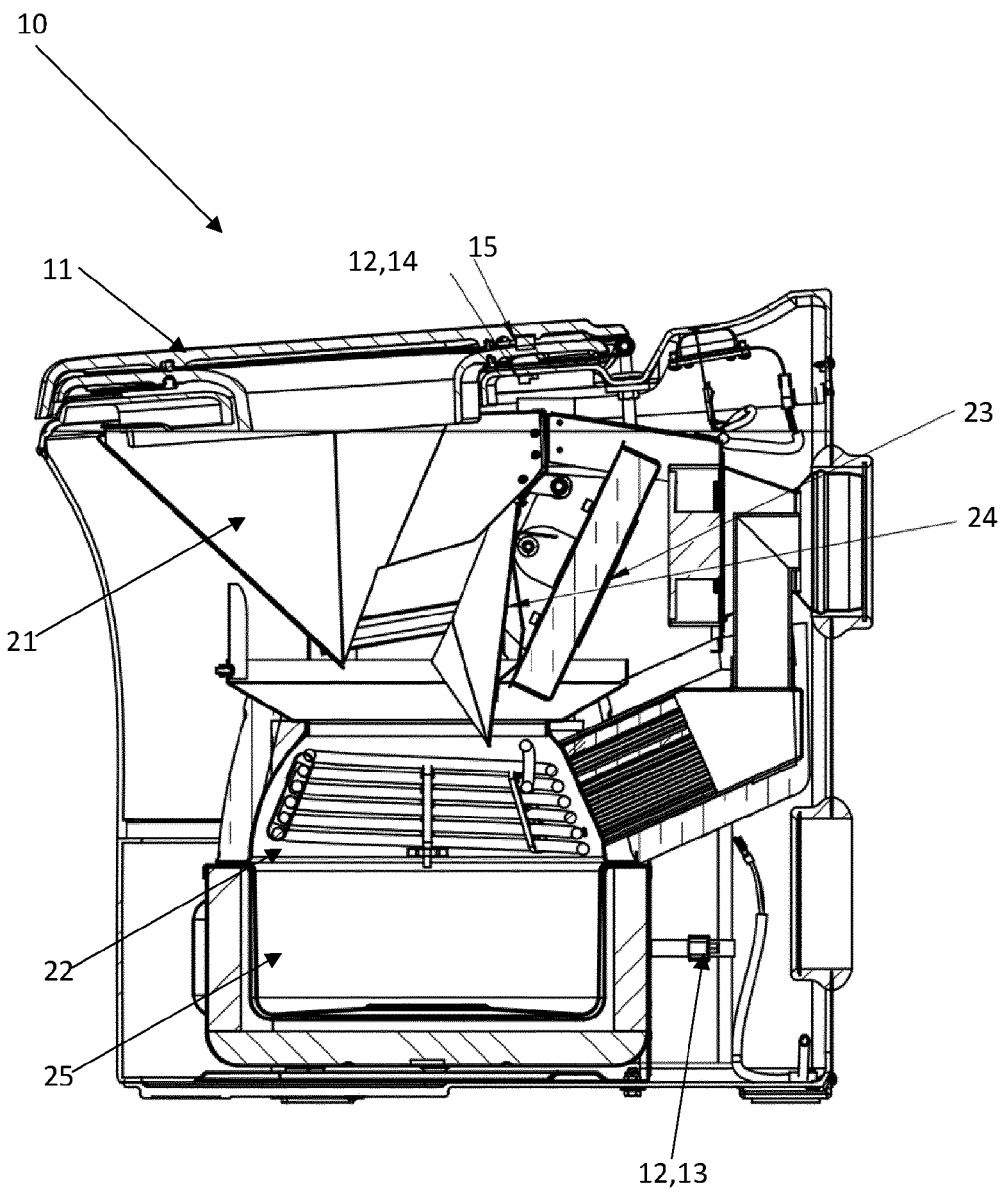
FIG. 2 shows a cross sectional view of the incineration toilet with the lid in closed position, allowing the incineration chamber hatch to be opened.

FIG. 2 shows the incineration toilet 10 where the lid 11 is in the closed position. In this position, the security control system 20 allows the electric motor 26 to open the incineration chamber hatch 23 so that the waste pouch can fall into the incineration chamber 22. The incineration process may then start when the incineration chamber hatch 23 is again closed after depositing the waste pouch.

The security control system allows the incineration to start only in the event the incineration chamber hatch 23 is in the closed position. This means that during deposit of the waste pouch, or when the incineration chamber hatch 23 is in the open position, the incineration process will be stopped or prevented from being started.

The security system may comprise a hatch control system for reading the position of the incineration chamber hatch 23. When depositing ("flushing") the waste into the incineration chamber 22, the waste pouch may sometimes be stuck, jammed, or wedged between the incineration chamber opening and the incineration chamber hatch 23. The hatch control system controls that the incineration chamber hatch 23 is totally closed prior to starting of the incineration process.

Figure 3:
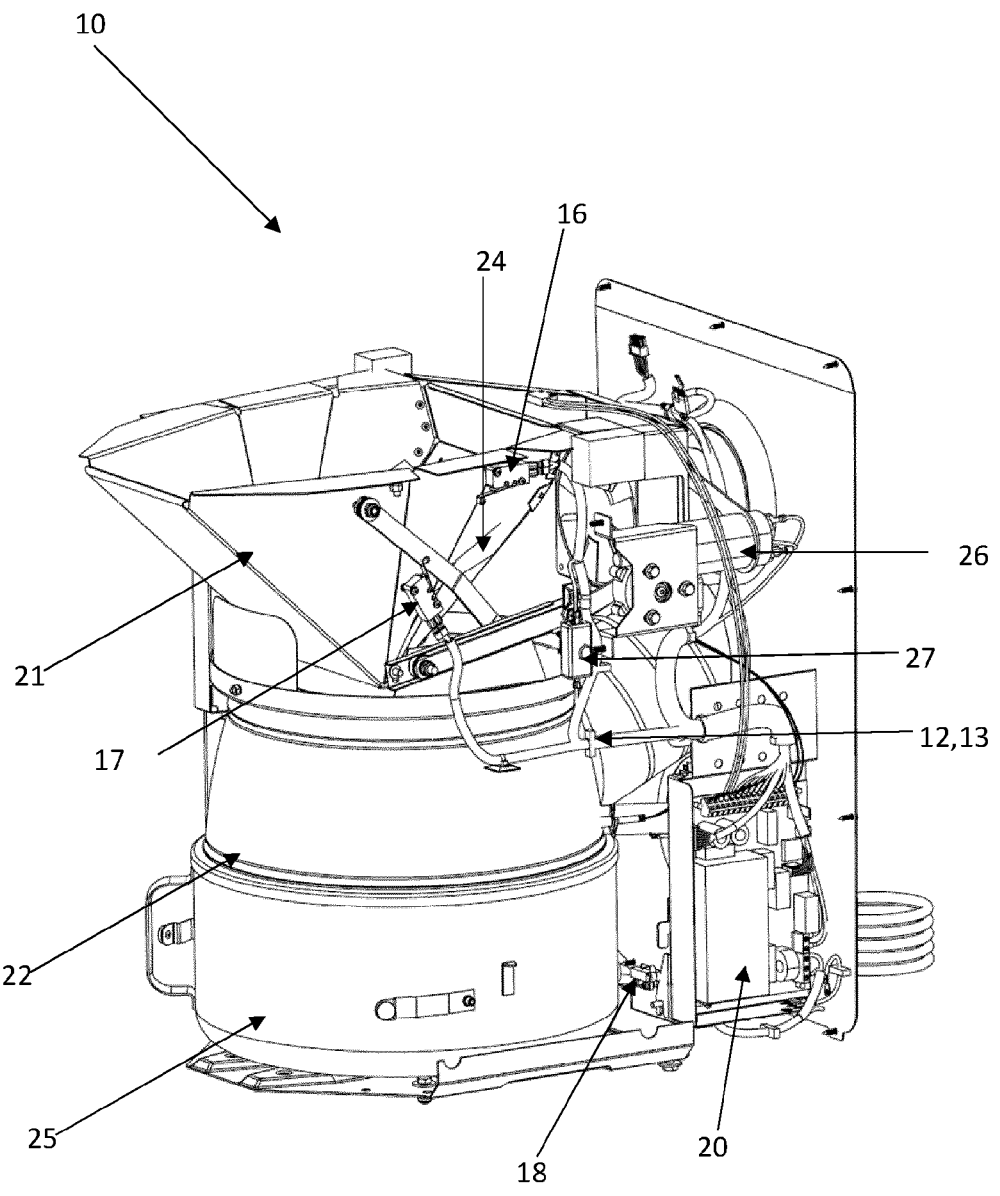
FIG. 3 shows the internal of the incineration toilet with the pouch bowl, incineration chamber, ash tray and sensors.

As shown in FIG. 3, the hatch control system comprises a first hatch sensor 16 for reading the open position of the incineration chamber hatch 23, and a second hatch sensor 17 for reading the closed position of the hatch 23. The hatch sensors 16, 17 may be position sensors, wherein the first hatch sensor 16 is located adjacent the upper position of the incineration chamber hatch 23 for reading the hatch 23 position when it is in the open position, and the second hatch sensor 17 is located adjacent the lower position of the incineration chamber hatch 23 for reading the position of the hatch 23 when it closes the opening of the incineration chamber 22 entirely.

The second hatch sensor 17 communicates with the security control system 20 such that the incineration can start only in the event the incineration chamber hatch 23 is in the closed position. In the event of jamming, the second hatch sensor 17 will read that the incineration chamber hatch 23 is not completely closing the incineration chamber 22, and the incineration process will not start until the jamming is solved.

The one or more sensors 12 are connected to the security control system 20 which controls the power for running the electric motor 26 and burner/heating elements.

The security system may also comprise an ash tray position system comprising an ash tray position sensor 18 arranged to read the position of the ash tray 25; the ash tray position sensor 18 communicates with the security control system 20 such that the incineration process can start only in the event the ash tray 25 is in a predefined correct position. The ash tray position sensor 18 may be any of a position sensor and may be located at the back or any side, inside of the incineration toilet 10. FIG. 3 shows the ash tray position sensor 18 located at the back of the ash tray 25 when the ash tray 25 is in the predefined position.

The security system may further comprise a temperature guard device 27, the device 27 is triggered by a predefined temperature threshold value on the outside of the incineration chamber 22.

The temperature guard device 27 may be a mechanical switch adapted for cutting the power of the burner/heating element in the event the temperature is above a threshold value. For a gas-powered toilet, the gas supply for the incineration process is cut. An advantage with the mechanical switch is that it does not depend on a control system with software that can lag or malfunction. The power supply may be cut independent of the control system, but the control system may read that there are no power in the circuit and may activate an alarm. The temperature guard device 27 may be a push button that is ejected and may be manually reset, the temperature guard device may be a bi-metal switch.

The temperature guard device 27 may comprise a temperature sensor for reading the temperature on the outside of the incineration chamber 22 and communicate with the security control system 20 for comparing the measured value with the temperature threshold value. In the event the measured temperature exceeds the threshold value, the security control system cuts the power of the burner/heating element so that the incineration process stops.

This temperature guard device 27 is a safety arrangement that prevents the inside of the toilet (and outside the incineration chamber) to exceed the temperature threshold value. The temperature threshold value may be set to 105° C.

The invention claimed is:

1. An incineration toilet comprising:
a pouch bowl for holding a waste pouch, and
an incineration chamber with an incineration chamber hatch arranged below the pouch bowl for receiving the waste pouch for incineration, the incineration chamber hatch being openable by an electric motor,
wherein the pouch bowl comprises an openable bowl flap synchronized with the openable incineration chamber hatch such that when the electric motor opens the incineration chamber hatch, the bowl flap opens simultaneously such that the waste pouch can fall into the incineration chamber,
the incineration toilet further comprises a lid for covering a top opening of the pouch bowl, the lid is operable between an open position in which the top opening of the pouch bowl is open and can receive waste, and a closed position in which the top opening is closed and cannot receive waste,
wherein the incineration toilet further comprises a security system comprising:
a security control system, and
one or more sensors,
wherein the one or more sensors are arranged for reading the position of the lid and for measuring the temperature in the incineration chamber;
wherein the security control system controls the electric motor such that the incineration chamber hatch is prevented from being opened when the temperature in the incineration chamber is above a threshold value and the lid is in the open position,
wherein the one or more sensors is an inductive sensor arranged for reading the position of the lid,
wherein the inductive sensor is located below the toilet seat and arranged to detect a magnet situated in the lid to read the position of the lid,
wherein, in the event the inductive sensor detects the magnet, information that the lid is in the closed position is sent to the control system, wherein the control system further allows the electric motor to run such that the incineration chamber hatch and the pouch bowl flap can be opened,
wherein, in the event the inductive sensor detects no magnet, information that the lid is in the open position is sent to the control system and the electric motor is not allowed to start.

2. The incineration toilet according to claim 1, wherein the one or more sensors is a temperature sensor located in connection with the incineration chamber for measuring the temperature in the incineration chamber.

3. The incineration toilet according to claim 2, wherein the temperature sensor is configured to measures the temperature inside the incineration chamber and is configured to send the information to the security control system for comparison with the temperature threshold value.

4. The incineration toilet according to claim 3, wherein the temperature threshold value is 90° C., and the security control system prevents the incineration chamber hatch from being opened in the event the temperature in the incineration chamber is above 90° C.

5. The incineration toilet according to claim 1, wherein the incineration toilet further comprises a first hatch sensor and a second hatch sensor, and wherein the first hatch sensor and/or the second hatch sensor is arranged for reading the position of the incineration chamber hatch.

6. The incineration toilet according to claim 5, wherein the second hatch sensor is arranged to read a closed position of the incineration chamber hatch, and wherein the second hatch sensor communicates with the security control system such that the incineration can start only in the event the incineration chamber hatch is in the closed position.

7. The incineration toilet according to claim 1, wherein the incineration chamber comprises an ash tray, and wherein the incineration toilet further comprises an ash tray position sensor arranged to read the position of the ash tray, the ash tray position sensor communicates with the security control system such that the incineration can start only in the event the ash tray is in a predefined position.

8. The incineration toilet according to claim 1, wherein the security system comprises a temperature guard device comprising a temperature sensor for reading the temperature on the outside of the incineration chamber, wherein the temperature guard device is a mechanical switch adapted to cut power of a burner/heating element in the event the temperature outside the incineration chamber exceeds a threshold value.

* * * * *